US011608061B2

(12) United States Patent
Machida

(10) Patent No.: US 11,608,061 B2
(45) Date of Patent: Mar. 21, 2023

(54) VEHICLE CONTROL DEVICE

(71) Applicant: TOYOTA JIDOSHA KABUSHIKI KAISHA, Toyota (JP)

(72) Inventor: Ryosuke Machida, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 103 days.

(21) Appl. No.: 17/012,152

(22) Filed: Sep. 4, 2020

(65) Prior Publication Data

US 2021/0078575 A1 Mar. 18, 2021

(30) Foreign Application Priority Data

Sep. 12, 2019 (JP) .............................. JP2019-166375

(51) Int. Cl.
*B60W 30/14* (2006.01)
*B60W 50/08* (2020.01)
*B60W 30/182* (2020.01)
*B60W 30/095* (2012.01)

(52) U.S. Cl.
CPC ...... *B60W 30/143* (2013.01); *B60W 30/0956* (2013.01); *B60W 30/182* (2013.01); *B60W 50/085* (2013.01)

(58) Field of Classification Search
CPC .......... B60W 30/143; B60W 30/0956; B60W 30/182; B60W 50/085; B60W 30/14; B60W 30/146; B60W 30/18; B60W 30/18009; B60W 50/08; B60W 50/082
See application file for complete search history.

(56) References Cited

U.S. PATENT DOCUMENTS

| 10,013,819 | B2* | 7/2018 | Sugihara | G07C 5/0808 |
| 2015/0066327 | A1* | 3/2015 | Syed | B60W 30/143 701/93 |
| 2016/0339913 | A1 | 11/2016 | Yamashita et al. | |
| 2017/0313311 | A1* | 11/2017 | Niino | G08G 1/052 |
| 2017/0327120 | A1* | 11/2017 | Oh | B60W 30/09 |
| 2019/0308640 | A1* | 10/2019 | Miller | F02D 13/0234 |
| 2020/0156645 | A1* | 5/2020 | Niioka | B60W 30/18163 |
| 2021/0188356 | A1* | 6/2021 | Goto | B62D 6/00 |

FOREIGN PATENT DOCUMENTS

| EP | 3650294 A1 | 5/2020 |
| JP | 2015182526 A | 10/2015 |
| JP | 2016215917 A | 12/2016 |
| JP | 2018127153 A | 8/2018 |
| WO | 2019008649 A1 | 1/2019 |

* cited by examiner

*Primary Examiner* — Jeff A Burke
*Assistant Examiner* — Joshua Alexander Garza
(74) *Attorney, Agent, or Firm* — Dickinson Wright, PLLC

(57) ABSTRACT

A vehicle control device includes a memory configured to store a first target speed applied under a specific traveling situation and a second target speed that is equal to or less than the first target speed and applied to a traveling situation other than the specific traveling situation, and a processor configured to determine whether or not a traveling situation of the vehicle corresponds to the specific traveling situation, control a traveling speed of the vehicle in accordance with the first target speed when a traveling situation of the vehicle corresponds to the specific traveling situation, and control a traveling speed of the vehicle in accordance with the second target speed when a traveling situation of the vehicle differs from the specific traveling situation.

5 Claims, 7 Drawing Sheets

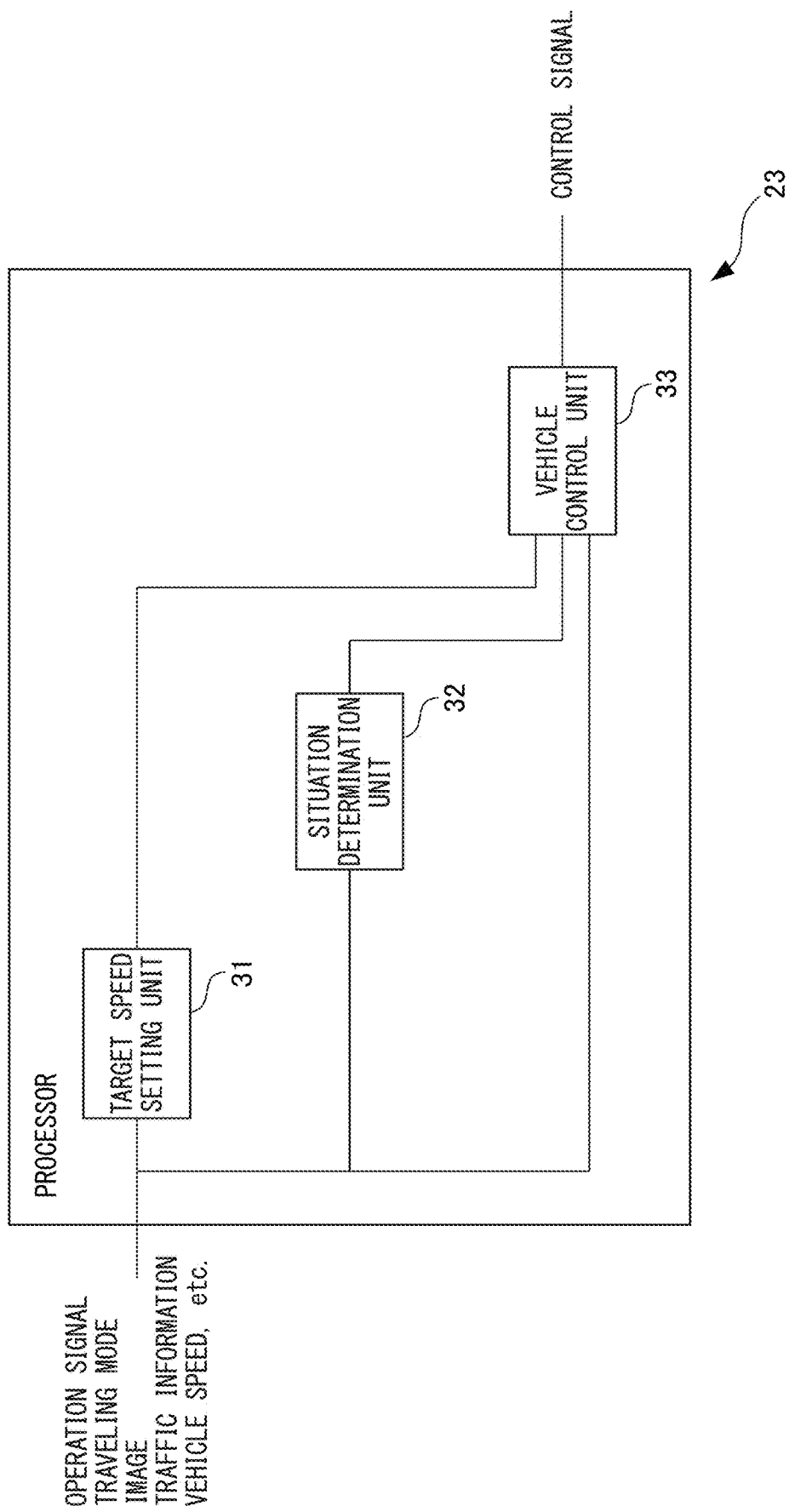

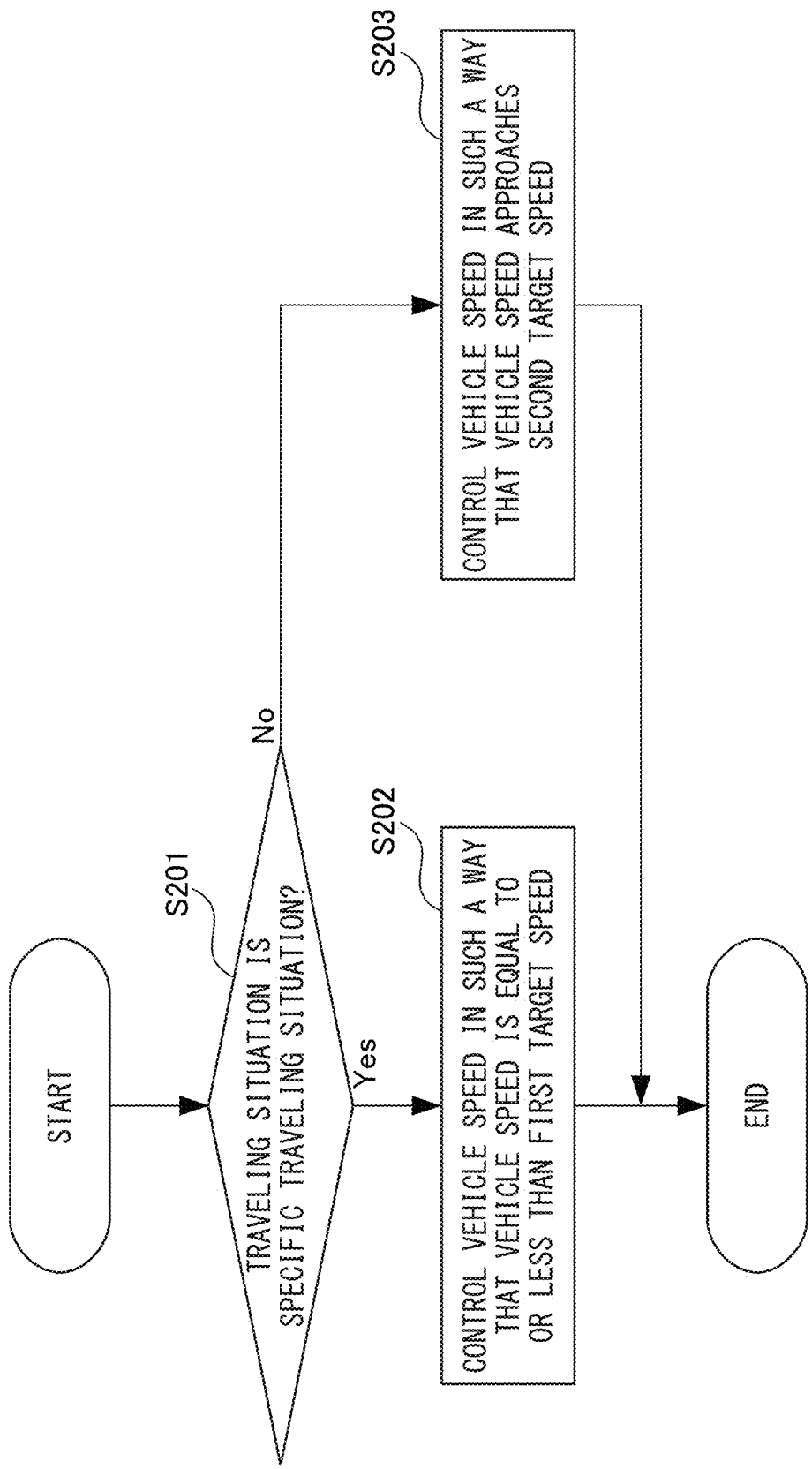

VEHICLE CONTROL DEVICE

FIELD

The present invention relates to a vehicle control device that controls traveling of a vehicle.

BACKGROUND

A technique for performing automated driving control on a vehicle or assisting with driving of a vehicle by a driver has been studied. In such a technique, it is required to appropriately set a target speed of a vehicle. Thus, a technique for automatically setting a target speed of a vehicle has been proposed (for example, see International Publication WO2019/008649). In the technique, an automatic driving control unit acquires a speed limit of an own vehicle traveling path during traveling of a vehicle, generates a target vehicle speed based on the speed limit, and generates target acceleration. Then, when generating the target acceleration, the automatic driving control unit sets a greater acceleration limiter so that an acceleration limit is relaxed as the speed limit is higher.

SUMMARY

However, in the technique described above, in a case where control of a vehicle that needs temporal acceleration is required, there is no room for acceleration when a traveling speed of a vehicle (hereinafter, may be simply referred to as a vehicle speed) is already a target speed, and therefore a vehicle control device may not appropriately perform such control of the vehicle.

Thus, an object of the present invention is to provide a vehicle control device that enables traveling control of a vehicle according to a situation.

According to one embodiment, a vehicle control device that automatically controls a traveling speed of a vehicle is provided. The vehicle control device includes: a memory configured to store a first target speed and a second target speed equal to or less than the first target speed; and a processor configured to determine whether or not a traveling situation of the vehicle corresponds to a specific traveling situation, control a traveling speed of the vehicle in accordance with the first target speed when a traveling situation of the vehicle corresponds to the specific traveling situation, and control a traveling speed of the vehicle in accordance with the second target speed when a traveling situation of the vehicle differs from the specific traveling situation.

It is preferable that the processor is further configured to set the first target speed and the second target speed in accordance with an operation of a driver via an operation instrument.

In this case, it is preferable that, when either one of the first target speed and the second target speed is input via the operation instrument, the processor sets the other of the first target speed and the second target speed in such a way that a speed difference between the first target speed and the second target speed is in a predetermined relationship.

In addition, in the vehicle control device, it is preferable that any of a plurality of traveling modes related to a request for a driving force of the vehicle can be set for the vehicle, and the processor sets the first target speed and the second target speed in such a way that a speed difference between the first target speed and the second target speed when a first traveling mode having a higher request for the driving force than that in another traveling mode among the plurality of traveling modes is set for the vehicle is greater than a speed difference between the first target speed and the second target speed when the another traveling mode is set for the vehicle.

Alternatively, it is preferable that the processor sets a speed difference between the first target speed and the second target speed in accordance with an environment around the vehicle.

In addition, it is preferable that the processor sets, in accordance with either one of the first target speed and the second target speed being input via the operation instrument and speed difference information representing a speed difference between the first target speed and the second target speed being input via the operation instrument, the other of the first target speed and the second target speed.

Further, it is preferable that any of a plurality of traveling modes related to a request for a driving force of the vehicle can be set for the vehicle, and the processor determines that a traveling situation of the vehicle corresponds to the specific traveling situation when a first traveling mode having a higher request for the driving force than that in another traveling mode among the plurality of traveling modes is set for the vehicle.

Furthermore, it is preferable that the processor detects another object around the vehicle based on a detection signal acquired by a sensor for detecting another object, and determines whether a traveling situation of the vehicle corresponds to the specific traveling situation based on a positional relationship between the detected other object and the vehicle.

The vehicle control device according to the present invention achieves an effect capable of performing traveling control of a vehicle according to a situation.

BRIEF DESCRIPTION OF DRAWINGS

FIG. 3 is a functional block diagram of a processor of the electronic control unit, relating to vehicle control processing.

FIG. 7 is an operation flowchart of the vehicle control processing.

DESCRIPTION OF EMBODIMENTS

Figure 1:
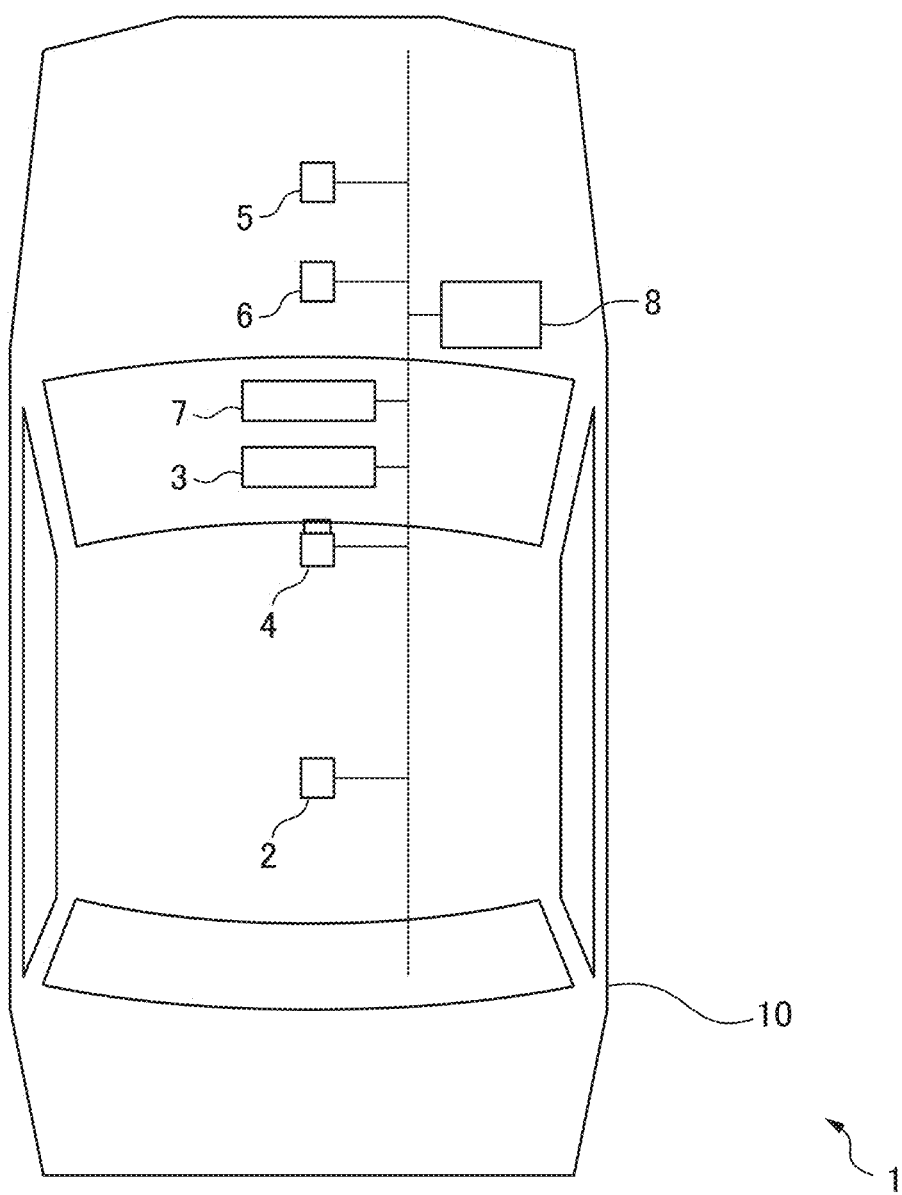
FIG. 1 is a schematic configuration diagram of a vehicle control system in which a vehicle control device is installed.

A vehicle control device will be described below with reference to the drawings. When the vehicle control device performs automated driving control on a vehicle or when the vehicle control device performs vehicle control for assisting with driving by a driver in such a way as to automatically adjust a traveling speed of a vehicle, the vehicle control device can set a first target speed that is applied to a specific traveling situation, and a second target speed that is applied to a traveling situation other than the specific traveling situation and is equal to or less than the first target speed. The first target speed is, for example, an upper limit speed of a vehicle speed applied in the specific traveling situation. On the other hand, the second target speed is, for example, a target cruising speed of the vehicle. Then, the vehicle control device automatically controls a traveling speed of the vehicle in accordance with an applied target speed either the first target speed or the second target speed. In such a manner, the vehicle control device can appropriately perform traveling control of the vehicle in accordance with a situation by setting two types of target speeds that can be switched in accordance with a traveling situation.

In the present embodiment, the specific traveling situation includes, for example, a situation where the vehicle control device proposes, to a driver, a change of a lane in which a vehicle travels (hereinafter, may be referred to as a lane change) and the driver approves the proposition, and a situation where a blinker starts to turn on as a preliminary operation of a lane change when the vehicle control device automatically performs the lane change. Note that the specific traveling situation may include the situation described above only when a reason for performing the lane change is to pass another vehicle that travels in front of a vehicle. Furthermore, the specific traveling situation may include a situation where a vehicle accelerates when a lane in which the vehicle is traveling merges with another lane, in order to avoid another vehicle traveling in the another lane. Still further, the specific traveling situation may include a situation where a traveling speed of a vehicle needs to be increased in order to avoid a collision, such as a situation where an inter-vehicular distance between the vehicle and another succeeding vehicle is less than a predetermined distance. Still further, the specific traveling situation may include a situation where a traveling mode among a plurality of traveling modes that can be set for the vehicle and are related to the request for the driving force in which a request for a driving force is higher than that in another traveling mode, that is, a traveling mode that emphasizes traveling performance of a vehicle is applied. For example, the plurality of traveling modes include an economy mode that emphasizes fuel efficiency, a normal mode that emphasizes a balance between fuel efficiency and traveling performance, and a sport mode that emphasizes traveling performance, and a situation where the sport mode among the traveling modes is applied may be included in the specific traveling situation.

Figure 2:
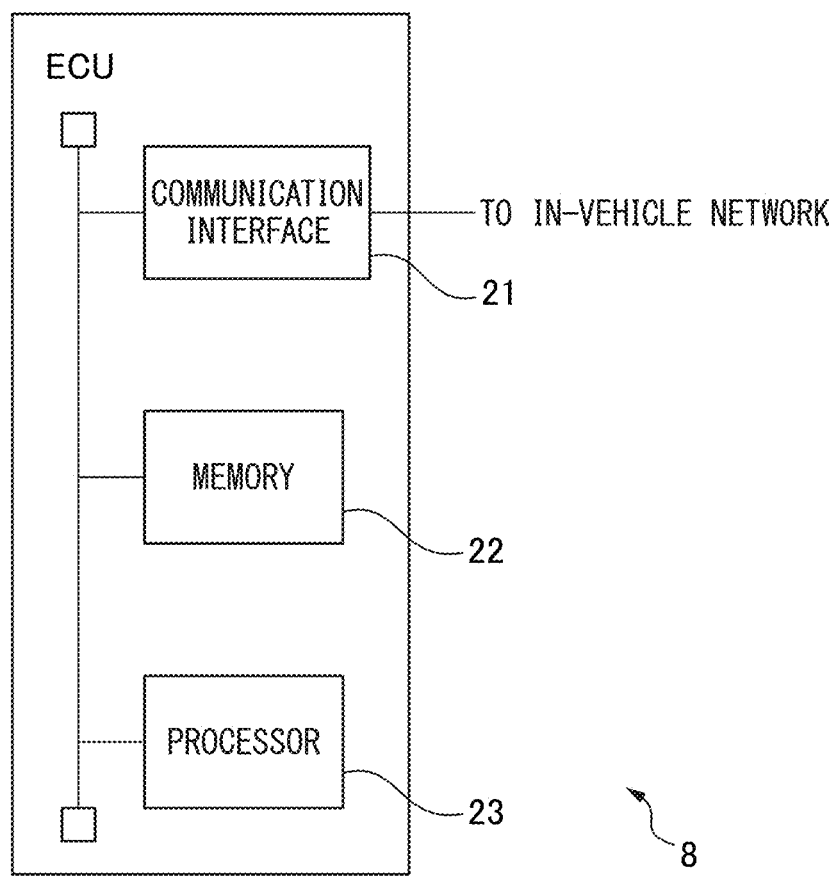
FIG. 2 is a hardware configuration diagram of an electronic control unit being one embodiment of the vehicle control device.

FIG. 1 is a schematic configuration diagram of a vehicle control system in which the vehicle control device is installed. Further, FIG. 2 is a hardware configuration diagram of an electronic control unit being one embodiment of the vehicle control device. In the present embodiment, a vehicle control system 1 that is installed in a vehicle 10 and controls the vehicle 10 includes a GPS receiver 2, a navigation device 3, a camera 4, a wireless communication device 5, a storage device 6, a user interface 7, and an electronic control unit (ECU) 8 being one example of the vehicle control device. The GPS receiver 2, the navigation device 3, the camera 4, the wireless communication device 5, the storage device 6, the user interface 7, and the ECU 8 are communicably connected via an in-vehicle network conforming to a standard such as a controller area network. Note that the vehicle control system 1 may further include a distance sensor that measures a distance from the vehicle 10 to an object existing around the vehicle 10, such as a LiDAR or a radar (not illustrated). Note that the camera 4 and the distance sensor are one example of a detection unit. Further, an image generated by the camera 4 and a distance measuring signal by the distance sensor are one example of a detection signal.

The GPS receiver 2 receives a GPS signal from a GPS satellite at each predetermined period, and measures a self-position of the vehicle 10 on the basis of the received GPS signal. Then, the GPS receiver 2 outputs a measurement result of the self-position of the vehicle 10 on the basis of the GPS signal at each predetermined period to the navigation device 3 and the ECU 8 via the in-vehicle network. Note that the vehicle control system 1 may include a receiver conforming to another satellite measurement system instead of the GPS receiver 2.

The navigation device 3 executes navigation processing on the vehicle 10 in accordance with a navigation program operating on the own device. For example, when activation of the navigation program is instructed by an operation of a driver and a destination of the vehicle 10 is input, the navigation device 3 determines a traveling route of the vehicle 10 from a current position of the vehicle 10 to the destination in accordance with a predetermined route search method such as a Dijkstra method with reference to a navigation map stored in the navigation device 3. The traveling route includes, for example, information representing a road to the destination, a position of an intersection at which a right turn or a left turn is made, and the like. Note that the navigation device 3 can use, as a current position of the vehicle 10, a self-position of the vehicle 10 by a newest measurement result received from the GPS receiver 2, for example. When calculating a traveling route of the vehicle 10, the navigation device 3 outputs information representing the traveling route to the ECU 8 via the in-vehicle network.

The camera 4 includes a two-dimensional detector configured with an array of photoelectric conversion elements having sensitivity to visible light, such as a CCD or a C-MOS, and an imaging optical system that forms an image of a region to be captured on the two-dimensional detector. The camera 4 is mounted, for example, inside the vehicle room of the vehicle 10 in such a way that it is oriented in a forward direction of the vehicle 10. Then, the camera 4 captures a region ahead of the vehicle 10 at each predetermined imaging period (for example, $1/30$ seconds to $1/10$ seconds), and generates an image in which the region ahead is captured. The image generated by the camera 4 may be a color image or a gray image. Note that a plurality of cameras having a different imaging direction or a different focal distance may be provided in the vehicle 10. For example, a camera oriented in a rearward direction of the vehicle 10 may be provided.

Every time the camera 4 generates an image, the camera 4 outputs the generated image to the ECU 8 via the in-vehicle network.

The wireless communication device 5 conforms to a predetermined mobile communication standard, and performs wireless communication with a wireless base station. Then, the wireless communication device 5 receives, from another device via the wireless base station, traffic information representing a traffic situation on a road on which the vehicle 10 is traveling or around the road (for example, information by vehicle information and communication system (VICS) (registered trademark)), and outputs the received traffic information to the ECU 8 via the in-vehicle network. Note that the traffic information includes, for example, presence or absence of a road construction, an accident, or a traffic restriction, and information related to a place and a time period in which the road construction, the accident, or the traffic restriction takes place. Further, the wireless communication device 5 may receive a high-accuracy map of a predetermined region around a current position of the vehicle 10, which is used for automated driving control, from a map server via the wireless base station, and output the received high-accuracy map to the storage device 6.

The storage device 6 includes, for example, a hard disk device or a non-volatile semiconductor memory. Then, the storage device 6 stores the high-accuracy map. Note that the high-accuracy map includes, for example, information representing a road marking such as a lane division line or a stop line of each road and information representing a road sign included in a predetermined region represented in the high-accuracy map.

Furthermore, the storage device 6 may include a processor for executing processing of updating a high-accuracy map, processing related to a request to read the high-accuracy map from the ECU 8, and the like. Then, for example, every time the vehicle 10 moves by a predetermined distance, the storage device 6 may transmit a request to acquire a high-accuracy map together with a current position of the vehicle 10 to the map server via the wireless communication device 5, and receive the high-accuracy map of a predetermined region around the current position of the vehicle 10 from the map server via the wireless communication device 5. Further, when the storage device 6 receives a request to read a high-accuracy map from the ECU 8, the storage device 6 clips a range that includes the current position of the vehicle 10 and is relatively narrower than the predetermined region described above from the stored high-accuracy map, and outputs the range to the ECU 8 via the in-vehicle network.

The user interface 7 is one example of an operation unit, and includes, for example, a touch panel display, or a plurality of switches and a display device. Furthermore, the user interface 7 may include a meter such as a speed meter. The user interface 7 is installed in a vehicle room of the vehicle 10, for example, in an instrumental panel in such a way as to face a driver. Further, when the user interface 7 includes a plurality of operation switches, the plurality of operation switches may be provided on a steering wheel. Then, the user interface 7 notifies the driver of various types of information received from the ECU 8 via the in-vehicle network by displaying the information. The user interface 7 may further include a speaker installed in the vehicle room. In this case, the user interface 7 notifies the driver of various types of information received from the ECU 8 via the in-vehicle network by outputting the information as a voice signal. Furthermore, the user interface 7 generates an operation signal according to an operation of the driver, and outputs the generated operation signal to the ECU 8. The operation signal includes, for example, a signal for setting one or both of a first target speed and a second target speed. Further, the operation signal may include a signal for changing one or both of the first target speed and the second target speed that are already set, or releasing the setting thereof. Furthermore, the operation signal may include a signal for setting a traveling mode.

The information notified to the driver by the user interface 7 includes, for example, information that notifies the first target speed and the second target speed that are being set or are already set.

The ECU 8 controls traveling of the vehicle 10. In the present embodiment, the ECU 8 determines whether or not a traveling situation of the vehicle 10 corresponds to the specific traveling situation. Then, when the traveling situation of the vehicle 10 corresponds to the specific traveling situation, the ECU 8 controls a vehicle speed of the vehicle 10 in accordance with the first target speed. On the other hand, when the traveling situation of the vehicle 10 differs from the specific traveling situation, the ECU 8 controls a vehicle speed of the vehicle 10 in accordance with the second target speed.

As illustrated in FIG. 2, the ECU 8 includes a communication interface 21, a memory 22, and a processor 23. The communication interface 21, the memory 22, and the processor 23 may each be configured as a different circuit or may be configured integrally as one integrated circuit.

The communication interface 21 includes an interface circuit for connecting the ECU 8 to the in-vehicle network. Then, every time the communication interface 21 receives a measurement result of a self-position from the GPS receiver 2, the communication interface 21 passes the received measurement result to the processor 23. Further, every time the communication interface 21 receives an image from the camera 4, the communication interface 21 passes the received image to the processor 23. Furthermore, when the communication interface 21 receives a traveling route from the navigation device 3, the communication interface 21 passes the received traveling route to the processor 23. Still further, the communication interface 21 passes a high-accuracy map read from the storage device 6 to the processor 23. Furthermore, the communication interface 21 passes an operation signal received from the user interface 7 to the processor 23. On the other hand, when the communication interface 21 receives notification information from the processor 23, the communication interface 21 outputs the received notification information to the user interface 7.

The memory 22 is one example of a storage unit, and includes, for example, a volatile semiconductor memory and a non-volatile semiconductor memory. The memory 22 stores various types of data used in vehicle control processing executed by the processor 23 of the ECU 8. For example, the memory 22 stores first and second target speeds, a speed difference or a speed increasing rate (speed reducing rate) between the first target speed and the second target speed, a flag representing a set traveling mode, an image around the vehicle 10, a measurement result of a self-position, a high-accuracy map, an internal parameter of the camera 4, various types of parameters for specifying a classifier for object detection being used in detection of a terrestrial object, another vehicle, or the like. Furthermore, the memory 22 temporarily stores various types of data generated during the vehicle control processing.

The processor 23 includes one or a plurality of central processing units (CPUs) and a peripheral circuit thereof. The processor 23 may further include another arithmetic circuit such as a logical arithmetic unit, a numerical arithmetic unit, or a graphics processing unit. Then, the processor 23 executes the vehicle control processing on the vehicle 10.

FIG. 3 is a functional block diagram of the processor 23, relating to the vehicle control processing. The processor 23 includes a target speed setting unit 31, a situation determination unit 32, and a vehicle control unit 33. Each of the units included in the processor 23 is, for example, a functional module achieved by a computer program operating on the processor 23. Alternatively, each of the units included in the processor 23 may be a dedicated arithmetic circuit provided in the processor 23.

The target speed setting unit 31 sets a first target speed and a second target speed in accordance with an operation of a driver via the user interface 7. In the present embodiment, when the driver performs an operation of starting to set a target speed via the user interface 7, and the processor 23 receives an operation signal representing the start of the setting thereof via the communication interface 21, the target speed setting unit 31 sets a first target speed and a second target speed in accordance with the operation of the driver.

For example, the target speed setting unit 31 individually sets the first target speed and the second target speed in accordance with the operation of the driver. In this case, for example, the target speed setting unit 31 causes the user interface 7 to display a message or an icon for causing the driver to perform an operation of selecting a target speed being a setting subject from the first target speed and the second target speed. Then, when the driver performs the operation of selecting the target speed being the setting subject in accordance with the message or the icon, and the processor 23 receives the operation signal generated by the user interface 7, the target speed setting unit 31 sets, as the setting subject, the target speed indicated by the operation signal either the first or the second target speeds. Note that, when a target speed being a setting subject is already set, the target speed setting unit 31 sets, as an initial value, the target speed that is already set, for example. On the other hand, when a target speed being a setting subject is not set, the target speed setting unit 31 may set, as an initial value of the target speed being the setting subject, a current vehicle speed of the vehicle 10 measured by a vehicle speed sensor (not illustrated) installed in the vehicle 10, or a speed limit of a road on which the vehicle 10 is currently traveling, which is specified with reference to a current position of the vehicle 10 and map information, for example.

The target speed setting unit 31 causes the user interface 7 to display a message or an icon indicating that the target speed being the setting subject is the first target speed or the second target speed. Furthermore, the target speed setting unit 31 may cause the user interface 7 to display a speed increasing icon for increasing the target speed being the setting subject by a predetermined speed (for example, 1 km/h) and a speed reducing icon for reducing the target speed being the setting subject by the predetermined speed. Alternatively, the user interface 7 may include a speed increasing switch for increasing the target speed being the setting subject by the predetermined speed and a speed reducing switch for reducing the target speed being the setting subject by the predetermined speed. Then, every time the driver operates the speed increasing icon or the speed increasing switch for once, the user interface 7 generates an operation signal representing that the target speed is increased by the predetermined speed, and outputs the generated operation signal to the ECU 8. Then, every time the processor 23 receives the operation signal, the target speed setting unit 31 updates the target speed being the setting subject in such a way as to increase the target speed by the predetermined speed. Similarly, every time the driver operates the speed reducing icon or the speed reducing switch for once, the user interface 7 generates an operation signal representing that the target speed is reduced by the predetermined speed, and outputs the generated operation signal to the ECU 8. Then, every time the processor 23 receives the operation signal, the target speed setting unit 31 updates the target speed being the setting subject in such a way as to reduce the target speed by the predetermined speed. Then, the target speed setting unit 31 stores an updated value of the target speed being the setting subject in the memory 22.

For example, when the target speed setting unit 31 does not receive the operation signal for a certain period (for example, 30 seconds to 1 minute) or longer since the target speed setting unit 31 receives the last operation signal from the user interface 7, the target speed setting unit 31 terminates the setting of the target speed being the setting subject. Alternatively, when the processor 23 receives the operation signal generated by operating, by the driver, a setting termination icon displayed on the user interface 7 or a setting termination switch included in the user interface 7, the target speed setting unit 31 may terminate the setting of the target speed being the setting subject.

In the present embodiment, the first target speed and the second target speed may be set simultaneously, or only either one of the first target speed or the second target speed may be set. Further, when the second target speed is set after the first target speed is set, the target speed setting unit 31 may limit an operation of the driver in such a way that the second target speed is equal to or less than the first target speed and a difference between the first target speed and the second target speed is equal to or greater than a predetermined speed difference. In other words, when a difference acquired by subtracting the second target speed updated due to reception of an operation signal instructing a speed increase or a speed reduction from the first target speed that is already set is less than the predetermined speed difference, the target speed setting unit 31 does not update the second target speed by the operation signal. For example, in a case in which the first target speed is set to 60 km/h and the predetermined speed difference is 10 km/h, the target speed setting unit 31 does not receive an operation of increasing the second target speed higher than 50 km/h via the user interface 7 even when the operation is performed. In other words, the target speed setting unit 31 does not set the second target speed to a value higher than 50 km/h. Conversely, when the first target speed is set after the second target speed is set, the target speed setting unit 31 may limit an operation of the driver in such a way that the first target speed is equal to or greater than the second target speed and a difference between the first target speed and the second target speed is equal to or greater than a predetermined speed difference. In other words, when a difference acquired by subtracting the second target speed that is already set from the first target speed updated due to reception of an operation signal instructing a speed increase or a speed reduction is less than the predetermined speed difference, the target speed setting unit 31 does not update the first target speed by the operation signal. Note that, when a difference between the first target speed and the second target speed is equal to the predetermined speed difference, the target speed setting unit 31 may cause the user interface 7 to display a message indicating that the difference between the first target speed and the second target speed cannot be made smaller anymore. Furthermore, the target speed setting unit 31 may limit an operation of the driver in such a way that a difference between the first target speed and the second target speed is equal to or less than a predetermined upper limit value. In this way, for example, when the second target speed is set first, the first target speed is prevented from being set to a speed excessively higher than the second target speed. Further, an operation of the driver of setting the first target speed to an excessively high speed is more likely to be a misoperation, and thus such a misoperation is prevented. In such a manner, the target speed setting unit 31 can prevent setting of an inappropriate target speed, and can thus prevent a loss of safety.

Figure 4A:
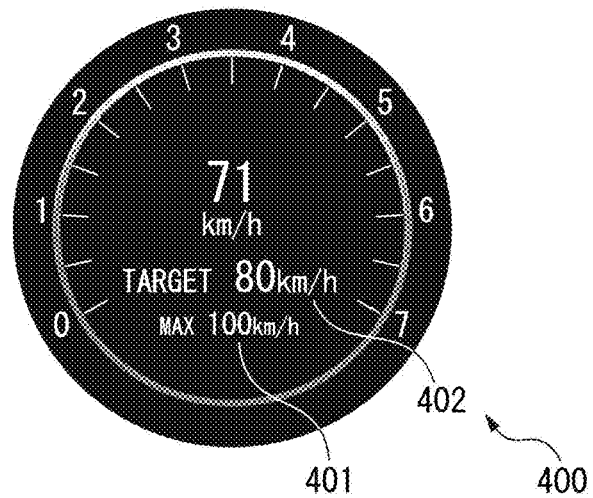
FIG. 4A is a diagram illustrating one example of a display content of a user interface representing each set target speed.
Figure 4B:
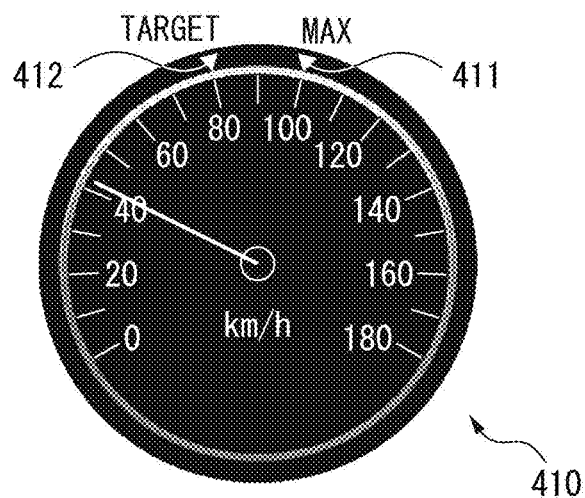
FIG. 4B is a diagram illustrating one example of a display content of the user interface representing each set target speed.
Figure 4C:
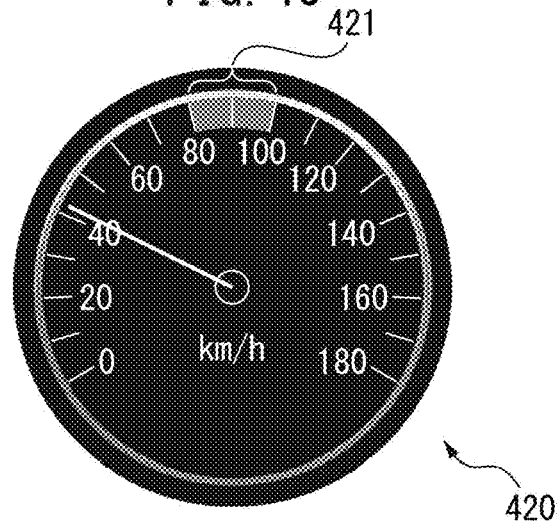
FIG. 4C is a diagram illustrating one example of a display content of the user interface representing each set target speed.

FIGS. 4A to 4C are diagrams each illustrating one example of a display content of the user interface 7 representing each set target speed. In the example illustrated in FIG. 4A, in a display screen image 400 displayed on the user interface 7, an engine speed is displayed in an analog meter form, and a vehicle speed is displayed at the center of the analog meter. Then, a first target speed 401 and a second target speed 402 are displayed in order from the bottom. In this example, the first target speed is displayed with a message of MAX represented as a maximum speed, and the second target speed is displayed with a message of TARGET represented as a target cruising speed. Note that the target speed setting unit 31 may cause the user interface 7 to display each of the target speeds in such a way that an applied target speed either the first target speed or the second target speed is displayed to be larger than the other target speed. Alternatively, the target speed setting unit 31 may set a display color or brightness of an applied target speed either the first target speed or the second target speed to be different from a display color or brightness of the other target speed. Still alternatively, the target speed setting unit 31 may cause the user interface 7 to display an applied target speed either the first target speed or the second target speed in such a way as to flash. Furthermore, the target speed setting unit 31 may switch a display order of the target speeds in a vertical direction in response to an applied target speed either the first target speed or the second target speed. For example, the target speed setting unit 31 may cause the user interface 7 to display each of the target speeds in such a way that an applied target speed is displayed on an upper side with respect to the other target speed.

In the example illustrated in FIG. 4B, in a display screen image 410 displayed on the user interface 7, a vehicle speed is displayed in an analog meter form. Then, a first target speed is indicated, on the analog meter, by an icon 411 on an arrow indicating a scale corresponding to the speed. Similarly, a second target speed is indicated, on the analog meter, by an icon 412 on an arrow indicating a scale corresponding to the speed. In other words, in this example, the first target speed is set to 100 km/h, the second target speed is set to 80 km/h, and the icon 411 and the icon 412 are displayed in such a way as to indicate a scale of 100 km/h and a scale of 80 km/h, respectively. Note that the target speed setting unit 31 may cause the user interface 7 to display each of the icons in such a way that the icon corresponding to an applied target speed either the first target speed or the second target speed is displayed to be larger than the icon corresponding to the other target speed.

In the example illustrated in FIG. 4C, in a display screen image 420 displayed on the user interface 7, a vehicle speed is displayed in an analog meter form. Then, a first target speed and a second target speed are indicated, on the analog meter, as an upper limit and a lower limit in a section 421 of a scale corresponding to the speed. In other words, in this example, the first target speed is set to 100 km/h, the second target speed is set to 80 km/h, and the section 421 from a scale of 80 km/h of the analog meter to a scale of 100 km/h is displayed to be different from the other section. For example, the sections may be displayed in such a way that a color or brightness of the section 421 and a color or brightness of the other section are different from each other. Furthermore, the target speed setting unit 31 may cause the user interface 7 to display an icon corresponding to an applied target speed either the first target speed or the second target speed together with the display screen illustrated in any of FIGS. 4A to 4C.

Figure 5A:
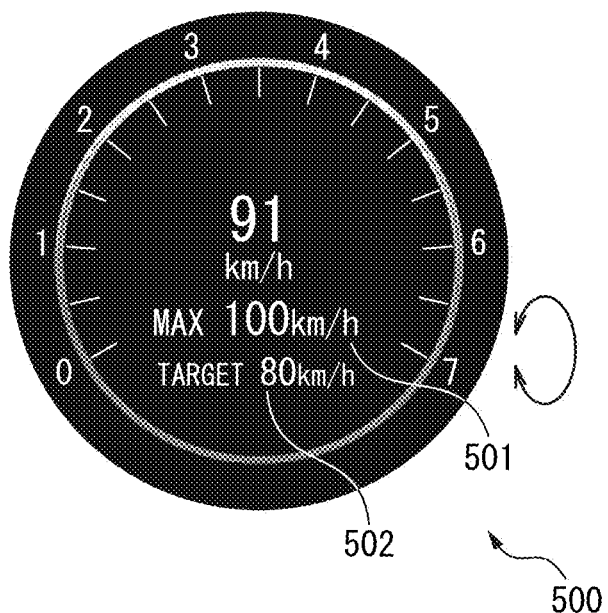
FIG. 5A is a diagram illustrating one example of a display content of the user interface when target speed is set.
Figure 5B:
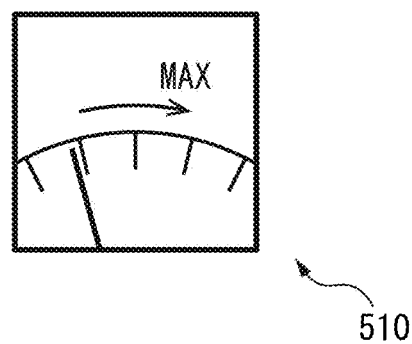
FIG. 5B is a diagram illustrating one example of a display content of the user interface when target speed is set.
Figure 5C:
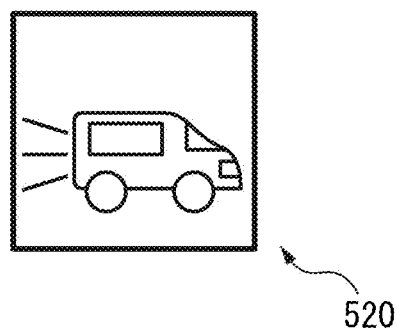
FIG. 5C is a diagram illustrating one example of a display content of the user interface when target speed is set.

FIGS. 5A to 5C are diagrams each illustrating one example of a display content of the user interface 7 when target speed is set. In the example illustrated in FIG. 5A, in a display screen image 500 on the user interface 7, a target speed being a setting subject either first or second target speeds is displayed on an upper side. In this example, the second target speed is the target speed being the setting subject, and thus a display order in the vertical direction of a first target speed 501 and a second target speed 502 is switched as compared to the display screen 400 illustrated in FIG. 4. Note that the target speed being the setting subject either the first target speed or the second target speed may be displayed to be larger than the other target speed. Alternatively, the target speed setting unit 31 may set a display color or brightness of the target speed being the setting subject either the first target speed or the second target speed to be different from a display color or brightness of the other target speed. Still alternatively, the target speed setting unit 31 may cause the user interface 7 to display the target speed being the setting subject either the first target speed or the second target speed in such a way as to flash.

In the example illustrated in FIGS. 5B and 5C, an icon corresponding to an operation of setting a target speed is displayed on, for example, a part of the display screen illustrated in FIG. 4A to 4C or 5A. For example, in the example illustrated in FIG. 5B, when an operation of increasing the second target speed is performed, an icon 510 indicating an arrow toward "MAX" is displayed on the user interface 7 in such a way as to represent the operation. Further, in the example illustrated in FIG. 5C, when an operation of increasing the second target speed is performed, an icon 520 representing a state where a vehicle accelerates is displayed on the user interface 7 in such a way as to represent the operation. Further, when an operation of reducing a target speed being a setting subject is performed, an icon that is different from the icon 510 and the icon 520 and represents a content of the operation may be displayed on the user interface 7. For example, an icon in which an arrow toward a low speed side is displayed or an icon representing a state where a vehicle slows down may be displayed on the user interface 7. Note that, together with the icons, a message (for example, "Accelerate towards max speed") representing a content of an operation may be displayed on the user interface 7. Furthermore, the target speed setting unit 31 may notify a driver of a set target speed or a change content of a target speed in accordance with an operation of the driver by outputting, together with the display as described above, a target speed being a setting subject or a voice signal representing an operation of increasing or reducing the target speed via a speaker provided on the inside of the vehicle 10.

Note that the icon 510 illustrated in FIG. 5B or the icon 520 illustrated in FIG. 5C may be displayed when a target speed applied by the vehicle control unit 33 is switched from the second target speed to the first target speed. In this way, a driver can easily recognize that an applied target speed is switched.

According to a modification example, when either one of the first target speed and the second target speed is input via the user interface 7, the target speed setting unit 31 may automatically set the other target speed in conjunction with the input target speed. At this time, the target speed setting unit 31 sets the other target speed in such a way that a speed difference between the other of the first target speed and the second target speed and the input target speed is in a predetermined relationship. In this case, a driver may set either the first target speed or the second target speed via the user interface 7. In this way, both of the target speeds are set only by manually setting either one of the target speeds, and thus an operation load on the driver is reduced.

In this modification example, when the processor 23 receives an operation signal representing a start of setting a target speed from the user interface 7 via the communication interface 21, the target speed setting unit 31 may cause the user interface 7 to display an icon or a message indicating a target speed being a setting subject.

When the first target speed is set by an operation of the driver via the user interface 7, the target speed setting unit 31 may set, as the second target speed, a speed acquired by subtracting a speed difference (for example, 20 km/h) that is previously set and stored in the memory 22 from the set first target speed. Conversely, when the second target speed is set by an operation of the driver via the user interface 7, the target speed setting unit 31 sets, as the first target speed, a speed acquired by adding a speed difference that is previously set and stored in the memory 22 to the set second target speed. Alternatively, when the first target speed is set by an operation of the driver via the user interface 7, the target speed setting unit 31 may set, as the second target speed, a speed acquired by multiplying the set first target speed by a predetermined speed reducing rate (for example, 0.8 to 0.9). Conversely, when the second target speed is set by an operation of the driver via the user interface 7, the target speed setting unit 31 may set, as the first target speed, a speed acquired by multiplying the set second target speed by a predetermined speed increasing rate (for example, 1.1 to 1.2).

Figure 6:
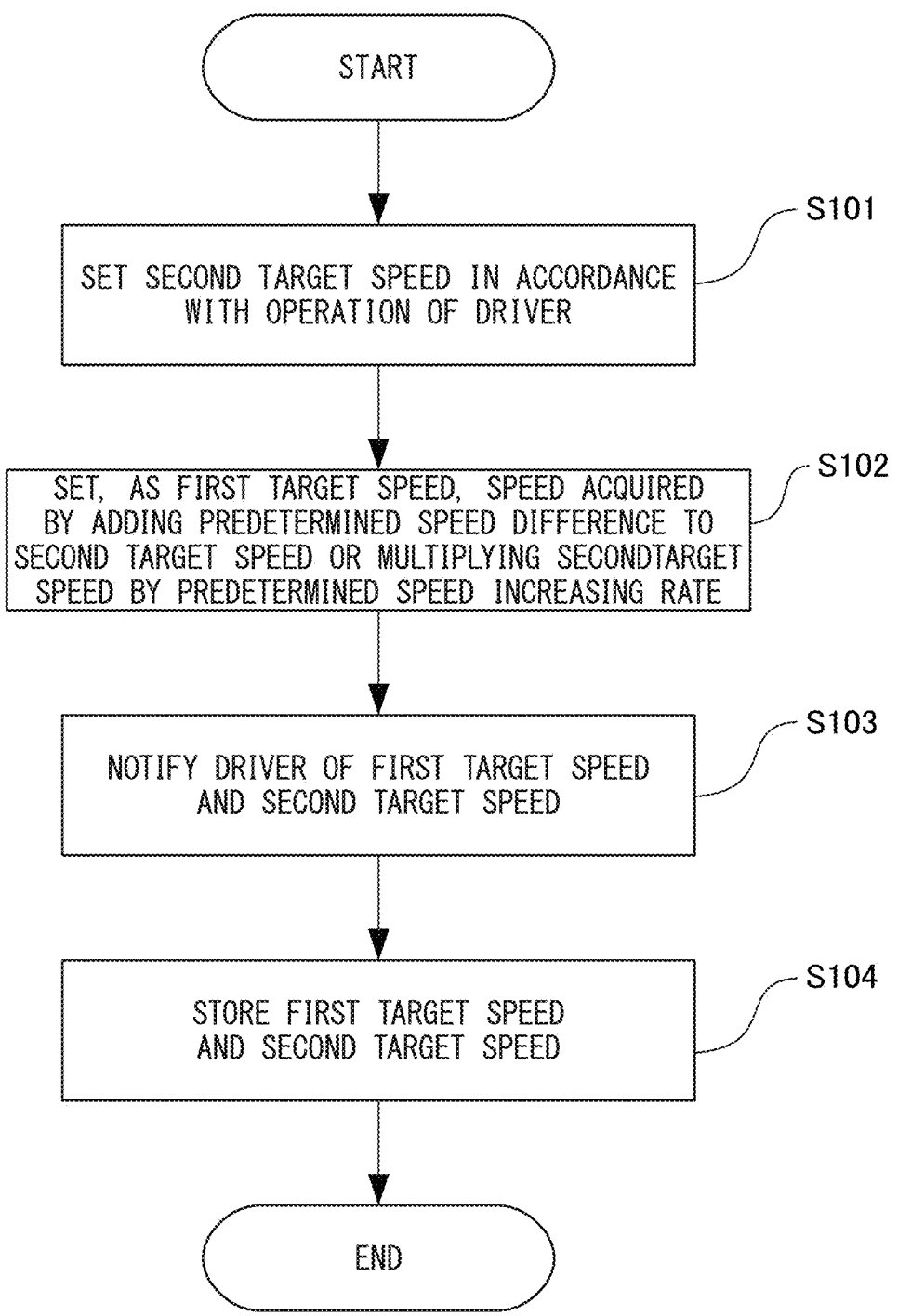
FIG. 6 is an operation flowchart of the target speed setting according to a modification example.

FIG. 6 is an operation flowchart of the target speed setting according to the modification example. When the processor 23 receives an operation signal representing a start of setting a target speed from the user interface 7 via the communication interface 21, the target speed setting unit 31 may set a first target speed and a second target speed according to the following operation flowchart. Note that, in the following operation flowchart, it is assumed that the second target speed is set by an operation of a driver via the user interface 7, and the first target speed is set in conjunction with the second target speed, but, as described above, the first target speed may be set by an operation of the driver, and the second target speed may be set in conjunction with the first target speed.

The target speed setting unit 31 sets the second target speed in accordance with an operation of a driver via the user interface 7 (step S101). The target speed setting unit 31 sets, as the first target speed, a speed acquired by adding a predetermined speed difference to the second target speed or multiplying the set second target speed by a predetermined speed increasing rate (step S102). The target speed setting unit 31 notifies the driver of the set first target speed and the set second target speed via the user interface 7 (step S103). Then, the target speed setting unit 31 stores the set first target speed and the set second target speed in the memory 22 (step S104). Then, the target speed setting unit 31 terminates target speed setting processing.

In this modification example, a different speed difference or a different speed increasing (speed reducing) rate may be associated with each of a plurality of traveling modes (for example, the economy mode, the normal mode, and the sport mode as described above), and may be previously stored in the memory 22. In this way, a speed difference between two target speeds is more appropriately set in accordance with an applied traveling mode, and thus the ECU 8 can more appropriately perform traveling control of the vehicle 10 in accordance with the applied traveling mode. For example, a speed difference (for example, 20 km/h) or a speed increasing rate (for example, 1.2) set for the sport mode may be greater than a speed difference (for example, 10 km/h) or a speed increasing rate (for example, 1.1) set for the economy mode and the normal mode. Note that a speed reducing rate may be set to an inverse of a speed increasing rate. Conversely, a speed difference (for example, 10 km/h) or a speed increasing rate (for example, 1.1) set for the economy mode may be smaller than a speed difference or a speed increasing rate set for the normal mode and the sport mode. Furthermore, when the economy mode is set, the target speed setting unit 31 may set the first target speed equal to the second target speed. In this case, when the processor 23 receives an operation signal representing that a driver sets any of the target speeds from the user interface 7, the target speed setting unit 31 may read a speed difference or a speed increasing rate (speed reducing rate) corresponding to a traveling mode set at the time from the memory 22, and use the speed difference or the speed increasing rate (speed reducing rate) for setting the target speed. Similarly, a plurality of modes having a speed difference or a speed increasing (speed reducing) rate different from each other (for example, passive, normal, and active) may be previously set separately from the traveling mode. In this case, the speed difference or the speed increasing (speed reducing) rate is associated with each of the plurality of traveling modes and previously stored in the memory 22. Then, the driver selects any of the modes via the user interface 7, and the target speed setting unit 31 may read the speed difference or the speed increasing (speed reducing) rate corresponding to the selected mode from the memory 22, and use the speed difference or the speed increasing (speed reducing) rate for setting the first target speed or the second target speed.

Further, in either of a case where the first target speed and the second target speed are individually set and a case where, in conjunction with an input of one of the first target speed and the second target speed, the other is automatically set, the target speed setting unit 31 may automatically change a speed difference, a speed increasing rate, or a speed reducing rate depending on an environmental condition or a geographical condition around the vehicle 10. For example, when a road surface is slippery due to rain, snow, and the like, when visibility is poor due to fog, nighttime, and the like, or when a traffic jam, an accident, a lane restriction, or the like occurs ahead of the vehicle 10, alternatively, when there is a sharp curve or a downhill ahead of the vehicle 10, the target speed setting unit 31 may set a speed difference or a speed increasing rate to be lower than that at a normal time. In this way, a speed difference between two target speeds is more appropriately set in accordance with an environmental condition or a geographical condition around the vehicle 10, and thus the ECU 8 can more appropriately perform traveling control of the vehicle 10 in accordance with the environmental condition or the geographical condition.

In this case, for example, the target speed setting unit 31 may acquire a measurement value of a rainfall amount from a rainfall amount sensor (not illustrated) provided in the vehicle 10, or may acquire a signal representing an operation situation of a wiper (not illustrated) from a control device (not illustrated) that controls the wiper. Then, when the measurement value of the rainfall amount exceeds a predetermined threshold value or when the wiper is operating at a period shorter than a predetermined operation period, the target speed setting unit 31 determines that a road surface is slippery due to rain, snow, and the like, and sets a speed difference or a speed increasing rate to be lower than that at the normal time. Alternatively, for example, when the target speed setting unit 31 calculates a statistical representative value (for example, average value, median value, or variance) of brightness of an image acquired from the camera 4, and the calculated statistical representative value is equal to or less than a predetermined threshold value, the target speed setting unit 31 may determine poor visibility and set a speed difference or a speed increasing rate to be lower than that at the normal time. Still alternatively, when a current time acquired from a clock (not illustrated) installed in the vehicle 10 is a time corresponding to nighttime, the target speed setting unit 31 may determine poor visibility and set a speed difference or a speed increasing rate to be lower than that at the normal time. Furthermore, the target speed setting unit 31 may determine whether a traffic jam, an accident, or a lane restriction occurs within a section from a current position of the vehicle 10 to a predetermined distance ahead along a traveling route, based on traffic information received via the wireless communication device 5, and the current position and the traveling route of the vehicle 10. Then, when a traffic jam, an accident, or a lane restriction occurs within the section, the target speed setting unit 31 may set a speed difference or a speed increasing rate to be lower than that at the normal time.

Further, the target speed setting unit 31 may change a speed difference or a speed increasing rate in such a way that the first target speed does not exceed a legally permitted speed in response to a difference between the second target speed and the legally permitted speed of a road on which the vehicle 10 is traveling. In this case, the target speed setting unit 31 may specify the legally permitted speed of the road on which the vehicle 10 is traveling, based on a current position and a traveling route of the vehicle 10.

Still alternatively, the target speed setting unit 31 may receive, via the user interface 7, either one of the first target speed and the second target speed and a speed difference, a speed increasing rate, or a speed reducing rate between the two target speeds. A speed difference, a speed increasing rate, or a speed reducing rate between the two target speeds is one example of speed difference information. Note that either one of the first target speed and the second target speed and a speed difference, a speed increasing rate, or a speed reducing rate are not limited to being set simultaneously, and may be set at timings different from each other. Then, similarly to the modification example described above, the target speed setting unit 31 may set the other of the first target speed and the second target speed, based on either one of the input first target speed and second target speed, and the input speed difference, speed increasing rate, or speed reducing rate.

The situation determination unit 32 determines, at each predetermined period, whether or not a traveling situation of the vehicle 10 is the specific traveling situation to which the first target speed is applied.

For example, the situation determination unit 32 detects another object around the vehicle 10, and determines whether or not a traveling situation of the vehicle 10 corresponds to the specific traveling situation in accordance with a positional relationship between the vehicle 10 and the detected another object. Specifically, the situation determination unit 32 may determine whether or not the vehicle 10 needs to perform a lane change, and determine whether or not a traveling situation of the vehicle 10 corresponds to the specific traveling situation, based on a determination result. In this case, for example, when another vehicle in front of the vehicle 10 (hereinafter, referred to as a preceding vehicle) travels in the same lane as that of the vehicle 10, and a speed of the preceding vehicle is slower than the second target speed set for the vehicle 10 by a predetermined value over a certain period, the situation determination unit 32 may determine that a lane change needs to be performed. In this case, the situation determination unit 32 detects the preceding vehicle from a series of images generated by the camera 4 during the latest certain period, for example. The situation determination unit 32 detects the preceding vehicle and a terrestrial object such as a lane division line on a road by inputting an image to a classifier, for example. Note that the classifier has been previously trained in such a way as to detect a subject to be detected, such as a vehicle and a terrestrial object, from an image. As the classifier used for detecting the subject, for example, a deep neural network (DNN) having a convolutional neural network (CNN) type architecture, such as a single shot multibox detector (SSD) or a faster R-CNN is used. Then, the situation determination unit 32 can estimate a speed of the preceding vehicle, based on a change in distance to the preceding vehicle in a certain period, which is acquired by a distance sensor installed in the vehicle 10 a vehicle speed of the vehicle 10 in the certain period, and a change in the vehicle speed, for example. Note that a region in which the preceding vehicle is included on the image represents a bearing from the camera 4 to the preceding vehicle, and thus a distance to an object present in the bearing, which is acquired by the distance sensor, can be a distance to the preceding vehicle. Alternatively, the situation determination unit 32 may estimate a speed of the preceding vehicle, based on a time-series change in size of a region in which the preceding vehicle is represented in a series of images generated by the camera 4 in a certain period, a vehicle speed of the vehicle 10 in the certain period, and a change in the vehicle speed of the vehicle 10. In this case, the situation determination unit 32 estimates, for each image, a distance from the vehicle 10 to the preceding vehicle at the time of generating the image, based on a ratio between a size of the region in which the preceding vehicle is represented on the image and a reference size on the image of the preceding vehicle when a distance to the preceding vehicle is a reference distance, and a size of the preceding vehicle in a real space. Note that the reference distance, the reference size on the image of the detected preceding vehicle, and the size in the real space may be previously stored in the memory 22, for example. Then, the situation determination unit 32 can estimate a speed of the preceding vehicle, based on a change in estimated distance to the preceding vehicle and a vehicle speed of the vehicle 10.

Further, the situation determination unit 32 specifies a lane in which the preceding vehicle travels, based on a positional relationship between a detected lane division line and the preceding vehicle, in order to determine whether or not the lane in which the vehicle 10 is traveling and the lane in which the preceding vehicle is traveling are the same. Furthermore, the situation determination unit 32 assumes a position and a posture of the vehicle 10, and projects a structure on a road (for example, a traffic marking such as a lane division line or a stop line) detected from an image acquired from the camera 4 onto a high-accuracy map, or projects a structure on a road around the vehicle 10 on a high-accuracy map onto an image. Then, the situation determination unit 32 estimates, as a self-position of the vehicle 10, an assumed position and posture of the vehicle 10 when the structure on the road detected from the image coincides the most with the structure on the road represented on the high-accuracy map. The situation determination unit 32 may specify a lane in which the self-position of the vehicle 10 is included as a lane in which the vehicle 10 is traveling with reference to the high-accuracy map. Then, the situation determination unit 32 may determine whether or not the lane in which the vehicle 10 is traveling and the lane in which the preceding vehicle is traveling are the same.

Furthermore, when a point at which a right turn or a left turn is required to make is included within a section at a predetermined distance along a traveling route from a current position of the vehicle 10, and the vehicle 10 is required to move from a lane in which the vehicle 10 is traveling to another lane in order to make a right turn or a left turn, the situation determination unit 32 may determine that the vehicle 10 needs to perform a lane change.

When the situation determination unit 32 determines that a lane change needs to be performed, for example, the situation determination unit 32 notifies, via the user interface 7, a driver that a lane change is performed. Then, when the processor 23 receives, from the user interface 7, an operation signal representing that the driver approves performance of the lane change, it is determined that a traveling situation of the vehicle 10 corresponds to the specific traveling situation. Alternatively, when the situation determination unit 32 determines that a lane change needs to be performed, the situation determination unit 32 may output, to a control device (not illustrated) that controls a blinker, via the communication interface 21, a control signal for causing a flashing operation of the blinker in such a way as to indicate a lane being a change destination, as a preliminary operation of a lane change. Then, when the processor 23 receives, from the control device, a signal representing that the flashing operation of the blinker starts, the situation determination unit 32 may determine that a traveling situation of the vehicle 10 corresponds to the specific traveling situation.

Similarly, the situation determination unit 32 may perform processing similar to the processing for the preceding vehicle on a vehicle that travels behind the vehicle 10 (hereinafter, referred to as a succeeding vehicle), to determine whether or not the succeeding vehicle travels in the same lane as that of the vehicle 10, and measure, when the succeeding vehicle is traveling in the same lane, an inter-vehicular distance between the succeeding vehicle and the vehicle 10. Then, when the inter-vehicular distance between the vehicle 10 and the succeeding vehicle traveling in the same lane is less than a predetermined distance, the situation determination unit 32 may determine that a traveling situation of the vehicle 10 corresponds to the specific traveling situation. Note that the predetermined distance may be changed in response to a vehicle speed of the vehicle 10. For example, a longer predetermined distance may be set as a vehicle speed of the vehicle 10 is faster.

Furthermore, when a point at which a lane in which the vehicle 10 is traveling merges with another lane is included within a section at a predetermined distance along a traveling route from a current position of the vehicle 10, the situation determination unit 32 determines whether or not a vehicle that travels in the another lane (hereinafter, referred to as another vehicle) is present from an image generated by the camera 4 or a distance measuring signal acquired by the distance sensor. Then, when a distance between the vehicle 10 and the another vehicle is less than a predetermined distance, the another vehicle is located behind the vehicle 10, and a vehicle speed of the another vehicle is equal to or greater than a vehicle speed of the vehicle 10, that is, when the vehicle 10 needs to avoid the another vehicle, the situation determination unit 32 may determine that a traveling situation of the vehicle 10 corresponds to the specific traveling situation. Note that the situation determination unit 32 detects another vehicle and a lane division line by performing processing similar to the processing on a preceding vehicle, and the situation determination unit 32 may specify a lane in which the another vehicle travels and measure a distance to the another vehicle.

In such a manner, the situation determination unit 32 can appropriately determine a traveling situation to which the first target speed needs to be applied by determining whether a traveling situation of the vehicle 10 is the specific traveling situation in accordance with a positional relationship between the vehicle 10 and another vehicle.

Furthermore, the situation determination unit 32 may determine whether or not a currently set traveling mode is a traveling mode corresponding to the specific traveling situation with reference to a flag that is stored in the memory 22 and represents the currently set traveling mode. Then, when the currently set traveling mode is a traveling mode corresponding to the specific traveling situation (for example, a sport mode), the situation determination unit 32 may determine that the traveling situation of the vehicle 10 corresponds to the specific traveling situation. In this way, the situation determination unit 32 can appropriately determine whether a traveling situation is a traveling situation to which a first target speed needs to be applied in accordance with a traveling mode intended by a driver.

The situation determination unit 32 notifies the vehicle control unit 33 of a determination result of whether or not a traveling situation of the vehicle 10 corresponds to the specific traveling situation, and a type of the corresponding specific traveling situation (i.e., lane change, merging, or the like) when the traveling situation of the vehicle 10 corresponds to the specific traveling situation.

The vehicle control unit 33 controls a vehicle speed of the vehicle 10 in accordance with a traveling situation of the vehicle 10. In other words, when a traveling situation of the vehicle 10 corresponds to the specific traveling situation, the vehicle control unit 33 controls a vehicle speed of the vehicle 10 in response to the first target speed. On the other hand, when the traveling situation of the vehicle 10 is not the specific traveling situation, the vehicle control unit 33 controls a vehicle speed of the vehicle 10 in response to the second target speed.

For example, when the ECU 8 performs automated driving control on the vehicle 10, the vehicle control unit 33 generates one or more trajectories to be traveled of the vehicle 10 in the latest predetermined section (for example, 500 m to 1 km) in such a way that the vehicle 10 travels along a traveling route to a destination. The trajectory to be traveled is represented as, for example, a set of target positions for the vehicle 10 at each of times when the vehicle 10 travels in a predetermined section. Then, the vehicle control unit 33 controls each unit of the vehicle 10 in such a way that the vehicle 10 travels along the trajectory to be traveled. At this time, when a traveling situation of the vehicle 10 is the specific traveling situation, the vehicle control unit 33 generates a trajectory to be traveled in such a way that a vehicle speed of the vehicle 10 is equal to or less than the first target speed. Furthermore, the vehicle control unit 33 may generate a trajectory to be traveled in accordance with a type of the specific traveling situation notified from the situation determination unit 32. For example, when a type of the specific traveling situation represents that performance of a lane change is included, the vehicle control unit 33 generates a trajectory to be traveled in such a way that the vehicle 10 changes a lane. On the other hand, when a traveling situation of the vehicle 10 is not the specific traveling situation, the vehicle control unit 33 generates a trajectory to be traveled in such a way that a vehicle speed of the vehicle 10 approaches the second target speed.

Furthermore, the vehicle control unit 33 generates a trajectory to be traveled in such a way that an object detected from a time-series of images generated by the camera 4 and existing around the vehicle 10 does not collide with the vehicle 10. For example, the vehicle control unit 33 tracks each object detected from a time-series of images, and estimates a predicted path of the each object up to a certain time later based on the path acquired by a tracking result. Note that, as described about the situation determination unit 32, every time an image is generated by the camera 4, a position and a posture of the vehicle 10 may be estimated by detecting lane division lines located on left and right of the vehicle 10 from the image, and matching the detected lane division lines with a high-accuracy map. Further, an estimated distance from the vehicle 10 to the detected object and a direction from the vehicle 10 toward the detected object are calculated from processing similar to the processing described in relation to the situation determination unit 32. Then, the vehicle control unit 33 can track the detected object by executing tracking processing using the Kalman filter, a particle filter, or the like on an estimated position of the detected object when each image is generated.

The vehicle control unit 33 generates, on the basis of the predicted path for each object being tracked, a trajectory to be traveled of the vehicle 10 in such a way that, for any object, a predicted value of the distance between the object being tracked and the vehicle 10 is equal to or greater than a predetermined distance until a certain time later. Note that a predetermined distance for another object traveling in a lane different from a lane in which the vehicle 10 will travel on the trajectory may be set to be shorter than a predetermined distance for another object traveling in the same lane as a lane in which the vehicle 10 will travel on the trajectory.

When a traveling situation of the vehicle 10 is not the specific traveling situation, the vehicle control unit 33 may set a trajectory to be traveled in such a way that a vehicle speed of the vehicle 10 approaches the second target speed as close as possible under a condition in which a predicted value of the distance between each object being tracked and the vehicle 10 is equal to or greater than a predetermined distance until a certain time later. At this time, the vehicle control unit 33 may allow the vehicle speed of the vehicle 10 to exceed the second target speed within a predetermined period and a predetermined tolerance. Alternatively, the vehicle control unit 33 may set a trajectory to be traveled in such a way that the vehicle speed of the vehicle 10 does not exceed the second target speed.

On the other hand, when a traveling situation of the vehicle 10 corresponds to the specific traveling situation, the vehicle control unit 33 may set a trajectory to be traveled in such a way that a predicted value of the distance between each object being tracked and the vehicle 10 is equal to or greater than a predetermined distance until a certain time later under a condition in which the vehicle speed of the vehicle 10 is equal to or less than the first target speed. Even when the traveling situation of the vehicle 10 corresponds to the specific traveling situation, the vehicle control unit 33 may allow the vehicle speed of the vehicle 10 to exceed the first target speed within a predetermined period and a predetermined tolerance. Further, when a type of the specific traveling situation represents that performance of a lane change due to passing of a preceding vehicle is included, the vehicle control unit 33 may set a trajectory to be traveled in such a way that the preceding vehicle can be passed in a short time as much as possible.

Note that the vehicle control unit 33 may generate a plurality of trajectories to be traveled. In this case, the vehicle control unit 33 may select a trajectory among the plurality of trajectories to be traveled in such a way that the sum of absolute values of accelerations of the vehicle 10 is minimum.

When a trajectory to be traveled is set, the vehicle control unit 33 controls each unit of the vehicle 10 in such a way that the vehicle 10 travels along the trajectory. For example, the vehicle control unit 33 calculates an acceleration of the vehicle 10 in accordance with the trajectory to be traveled and a current vehicle speed of the vehicle 10 measured by a vehicle speed sensor (not illustrated), and sets an accelerator position or a braking amount in such a way as to achieve the calculated acceleration. The vehicle control unit 33 then calculates an amount of fuel injection depending on the set accelerator position, and outputs a control signal in response to the amount of fuel injection to a fuel injection device of an engine of the vehicle 10. Alternatively, the vehicle control unit 33 outputs a control signal in response to the set braking amount to a brake of the vehicle 10.

Furthermore, the vehicle control unit 33 calculates, when the vehicle 10 changes the course in order to travel along the trajectory to be traveled, a steering angle for the vehicle 10 in accordance with the trajectory to be traveled, and outputs a control signal in response to the calculated steering angle to an actuator (not illustrated) that controls a steering wheel of the vehicle 10.

Further, when the ECU 8 assists with driving of a driver in such a way as to automatically adjust a vehicle speed of the vehicle 10, the vehicle control unit 33 may control a vehicle speed of the vehicle 10 under a condition in which a distance between an object existing around the vehicle 10 and the vehicle 10 is equal to or greater than a predetermined distance. At this time, as described above, when a traveling situation of the vehicle 10 corresponds to the specific traveling situation, the vehicle control unit 33 may control a vehicle speed of the vehicle 10 in such a way that the vehicle speed is equal to or less than the first target speed. On the other hand, when the traveling situation of the vehicle 10 is not the specific traveling situation, the vehicle control unit 33 may control a vehicle speed of the vehicle 10 in such a way that the vehicle speed approaches the second target speed. Note that, also in this example, when the traveling situation of the vehicle 10 corresponds to the specific traveling situation, the vehicle control unit 33 may allow the vehicle speed of the vehicle 10 to exceed the first target speed within a predetermined period and a predetermined tolerance. Further, when the traveling situation of the vehicle 10 is not the specific traveling situation, the vehicle control unit 33 may control a vehicle speed of the vehicle 10 in such a way that the vehicle speed of the vehicle 10 does not exceed the second target speed.

FIG. 7 is an operation flowchart of the vehicle control processing executed by the processor 23. The processor 23 may execute the vehicle control processing in accordance with the following operation flowchart at each predetermined period.

The situation determination unit 32 of the processor 23 determines whether or not a traveling situation of the vehicle 10 corresponds to the specific traveling situation (step S201). Then, the situation determination unit 32 notifies the vehicle control unit 33 of a determination result.

When the traveling situation of the vehicle 10 corresponds to the specific traveling situation (step S201—Yes), the vehicle control unit 33 of the processor 23 controls a vehicle speed of the vehicle 10 in such a way that the vehicle speed of the vehicle 10 is equal to or less than the first target speed (step S202). In other words, the vehicle control unit 33 generates a trajectory to be traveled with an upper limit of the vehicle speed of the vehicle 10 as the first target speed, and controls each unit of the vehicle 10 in such a way that the vehicle 10 travels along the generated trajectory to be traveled. On the other hand, when the traveling situation of the vehicle 10 does not correspond to the specific traveling situation (step S201—No), the vehicle control unit 33 may set a vehicle speed of the vehicle 10 in such a way that the vehicle speed of the vehicle 10 approaches the second target speed (step S203). In other words, the vehicle control unit 33 generates a trajectories to be traveled in such a way that the vehicle speed of the vehicle 10 approaches the second target speed, and controls each unit of the vehicle 10 in such a way that the vehicle 10 travels along the generated trajectory to be traveled. After step S202 or S203, the processor 23 terminates the vehicle control processing.

As described above, the vehicle control device can set a first target speed applied to a specific traveling situation, and a second target speed that is applied to a traveling situation other than the specific traveling situation and is equal to or less than the first target speed. Thus, the vehicle control device can appropriately perform traveling control of a vehicle in accordance with a situation. Therefore, when a vehicle travels at a cruising speed being a target or a speed close to the cruising speed, the vehicle control device can appropriately control the vehicle even in a situation where control of the vehicle that needs temporal acceleration is required, such as passing of a preceding vehicle. In this way, the vehicle control device can increase an opportunity at which such control of a vehicle that needs temporal acceleration can be applied. Further, the vehicle control device can control a vehicle in such a way as to achieve traveling that more appropriately reflects a set traveling mode.

As described above, those skilled in the art may make various changes in conformity to an embodiment within the scope of the present invention.

What is claimed is:

1. A vehicle control device that automatically controls a traveling speed of a vehicle, the vehicle control device comprising:
    a memory configured to store a first target speed and a second target speed equal to or less than the first target speed; and
    a processor configured to
        determine whether or not a traveling situation of the vehicle corresponds to a specific traveling situation,
        control a traveling speed of the vehicle in accordance with the first target speed when a traveling situation of the vehicle corresponds to the specific traveling situation, and
        control a traveling speed of the vehicle in accordance with the second target speed when a traveling situation of the vehicle differs from the specific traveling situation;
    wherein any of a plurality of traveling modes related to a request for a driving force of the vehicle can be set for the vehicle,
    wherein the processor is further configured to set the first target speed and the second target speed in accordance with an operation of a driver via an operation instrument
    wherein the processor sets the first target speed and the second target speed in such a way that a speed difference between the first target speed and the second target speed when the first traveling mode is set for the vehicle is greater than a speed difference between the first target speed and the second target speed when the another traveling mode is set for the vehicle; and
    the processor determines that a traveling situation of the vehicle corresponds to the specific traveling situation when a first traveling mode having a higher request for the driving force than that in another traveling mode among the plurality of traveling modes is set for the vehicle.

2. The vehicle control device according to claim 1, wherein,
    when either one of the first target speed and the second target speed is input via the operation instrument, the processor sets the other of the first target speed and the second target speed in such a way that a speed difference between the first target speed and the second target speed is in a predetermined relationship.

3. The vehicle control device according to claim 1, wherein
    the processor sets a speed difference between the first target speed and the second target speed in accordance with an environment around the vehicle.

4. The vehicle control device according to claim 1, wherein
    the processor sets, in accordance with either one of the first target speed and the second target speed being input via the operation instrument and speed difference information representing a speed difference between the first target speed and the second target speed being input via the operation instrument, the other of the first target speed and the second target speed.

5. The vehicle control device according to claim 1, wherein
    the processor detects another object around the vehicle, based on a detection signal acquired by a sensor for detecting another object, and further determines whether a traveling situation of the vehicle corresponds to the specific traveling situation based on a positional relationship between the detected other object and the vehicle.

* * * * *